US010138062B2

(12) United States Patent
High et al.

(10) Patent No.: US 10,138,062 B2
(45) Date of Patent: Nov. 27, 2018

(54) ORDER FULFILLMENT SYSTEM WITH ROBOTIC BREAK PACK

(71) Applicant: Walmart Apollo, LLC, Bentonville, AR (US)

(72) Inventors: Donald R. High, Noel, MO (US); Michael D. Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/597,463

(22) Filed: May 17, 2017

(65) Prior Publication Data
US 2017/0334646 A1   Nov. 23, 2017

Related U.S. Application Data

(60) Provisional application No. 62/340,276, filed on May 23, 2016.

(51) Int. Cl.
   *B65G 1/137*   (2006.01)
   *G06Q 30/06*   (2012.01)
   *G06Q 10/08*   (2012.01)

(52) U.S. Cl.
   CPC ........ *B65G 1/1373* (2013.01); *B65G 1/1376* (2013.01); *G06Q 10/0875* (2013.01); *G06Q 30/0635* (2013.01)

(58) Field of Classification Search
   CPC .................. G06Q 10/0875; B65G 1/1373
   See application file for complete search history.

(56) References Cited

U.S. PATENT DOCUMENTS

| 6,721,762 B1 | 4/2004 | Levine |
| 7,313,460 B1 | 12/2007 | Prater |

(Continued)

FOREIGN PATENT DOCUMENTS

| EP | 2322434 | 5/2011 | |
| EP | 2322434 A1 * | 5/2011 | ............. B65B 69/00 |

(Continued)

OTHER PUBLICATIONS

Fanuc America Corporation, "Robotic Shelf Picking—IAM Robotics Automated Storage & Retrieval System (AS/RS)", https://www.youtube.com/watch?v=h9eRDyZJzSA, published on Aug. 4, 2015, pp.

(Continued)

*Primary Examiner* — Thomas Randazzo
(74) *Attorney, Agent, or Firm* — Fitch, Even, Tabin & Flannery LLP

(57) ABSTRACT

In some embodiments, methods and systems for fulfilling consumer orders are provided. A stocking station includes at least one robotic stocking arm configured to unload a product from a first receptacle and to place the unloaded product onto a storage shelf, and a first picking station includes a first robotic picking arm configured to pick a first product from the storage shelf and to load the first product picked from the storage shelf into a second receptacle for delivery to a consumer. An empty receptacle placement station includes at least one robotic placing arm configured to place an empty second receptacle onto a packing conveyor configured to transport the empty second receptacle toward the first picking station for loading of the first product into the empty second receptacle. An electronic inventory management device transmits a signal the empty receptacle placement station and the first robotic picking arm.

15 Claims, 3 Drawing Sheets

(56) References Cited

U.S. PATENT DOCUMENTS

| | | | |
|---|---|---|---|
| 9,120,622 B1 | 9/2015 | Elazary | |
| 9,174,758 B1 | 11/2015 | Rowley | |
| 9,195,959 B1* | 11/2015 | Lopez | G06Q 10/08 |
| 9,378,484 B1* | 6/2016 | Russell | G06Q 10/0875 |
| 2001/0051905 A1* | 12/2001 | Lucas | G06Q 10/06 |
| | | | 705/29 |
| 2003/0083963 A1* | 5/2003 | Benson | G06Q 10/087 |
| | | | 705/28 |
| 2011/0125566 A1* | 5/2011 | McLaughlin | G06Q 20/20 |
| | | | 705/14.23 |
| 2013/0186044 A1 | 7/2013 | Cremer | |
| 2013/0310969 A1* | 11/2013 | Terzini | G06F 19/3462 |
| | | | 700/235 |
| 2014/0088748 A1* | 3/2014 | Woodtli | B65G 1/0492 |
| | | | 700/113 |
| 2014/0230374 A1* | 8/2014 | Tian | G06Q 10/04 |
| | | | 53/445 |
| 2014/0244026 A1 | 8/2014 | Neiser | |
| 2015/0178654 A1* | 6/2015 | Glasgow | G06Q 10/06315 |
| | | | 705/7.25 |
| 2016/0162830 A1* | 6/2016 | Devaiah | G06Q 10/087 |
| | | | 705/14.13 |
| 2016/0284013 A1* | 9/2016 | Matsuura | G06Q 30/0635 |
| 2017/0011449 A1* | 1/2017 | Mueller | G06Q 30/0635 |

FOREIGN PATENT DOCUMENTS

| | | |
|---|---|---|
| WO | 2014195902 | 12/2014 |
| WO | 2015118171 | 8/2015 |

OTHER PUBLICATIONS

Nichols, Greg; "How a grocery delivery service became a red hot robotics company"; http://www.zdnet.com/article/howagrocerydeliveryservicebecamearedhotroboticscompany/; Jun. 20, 2015; pp. 1-8.

PCT; App. No. PCT/US2017/33742; International Search Report and Written Opinion dated Aug. 16, 2017.

* cited by examiner

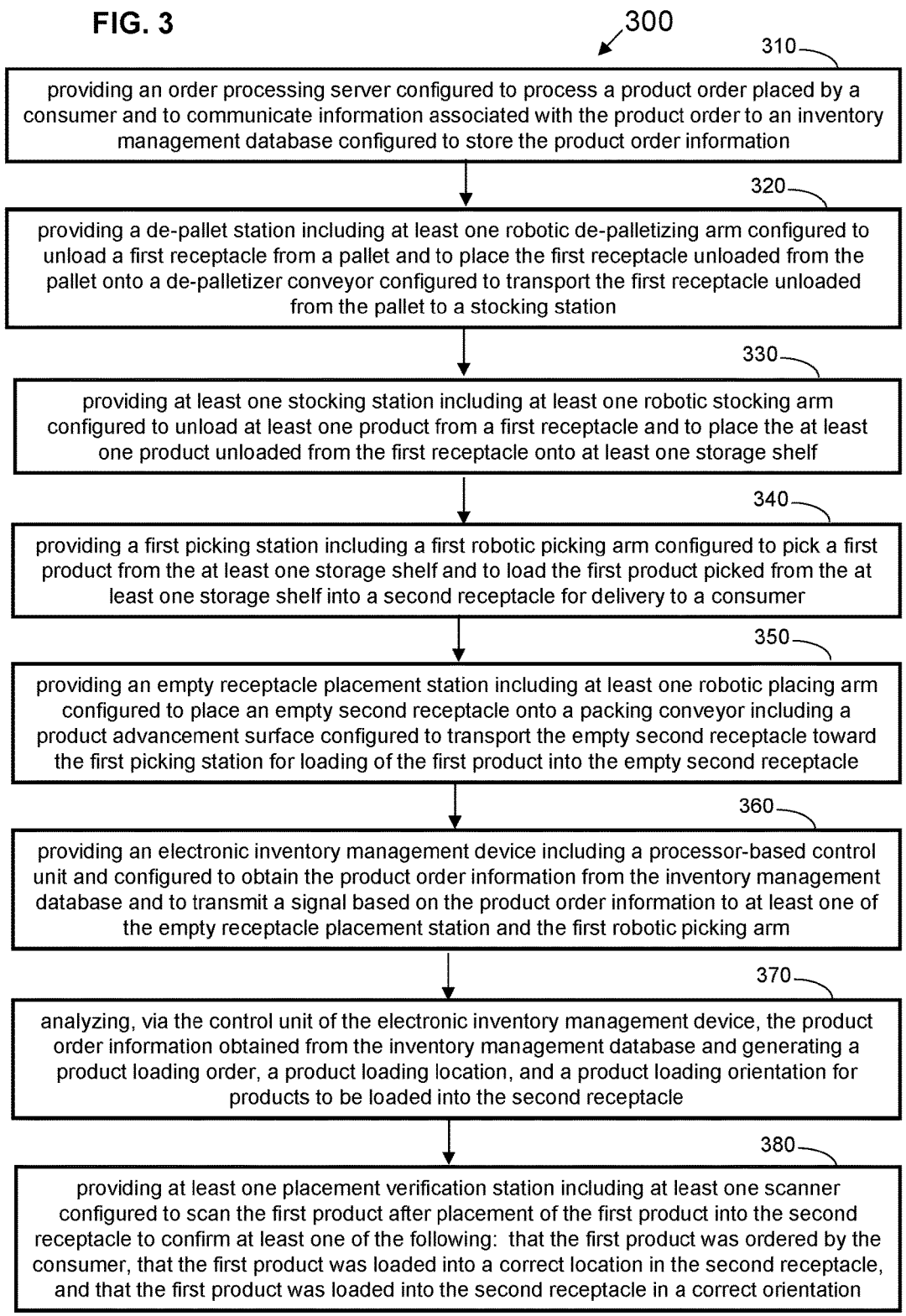

ORDER FULFILLMENT SYSTEM WITH ROBOTIC BREAK PACK

CROSS-REFERENCE TO RELATED APPLICATION

This application claims the benefit of U.S. Provisional Application No. 62/340,276, filed May 23, 2016, which is incorporated herein by reference in its entirety.

TECHNICAL FIELD

This invention relates generally to managing product inventory and, in particular, to systems and methods for fulfilling product orders placed by consumers.

BACKGROUND

Consumers often place product orders over the internet from retailers of consumer products such as Walmart. Such product orders are typically fulfilled at distribution centers of the retailer. Generally, at a distribution center, products delivered to a product distribution facility are manually picked from one case and manually packed into in another case for delivery to the consumers and/or brick-and-mortar stores of the retailers associated with the geographic locations of the consumers placing the orders. A disadvantage of such systems is that manual unpacking of cases and manual packing of cases by workers at product distribution facilities is time consuming, requires a significant number of worker hours and results in significant increases in operation costs for retailers. In addition, manual operations by workers at product distribution facilities may be associated with human error, leading to improper products being delivered, further increasing operation costs for retailers and/or resulting in a loss of customers for the retailers.

BRIEF DESCRIPTION OF THE DRAWINGS

Disclosed herein are embodiments of systems, apparatuses, methods, and systems pertaining to fulfilling consumer orders. This description includes drawings, wherein:

FIG. 3 is a flow chart diagram of a process of fulfilling consumer product orders in accordance with some embodiments.

Figure 1:
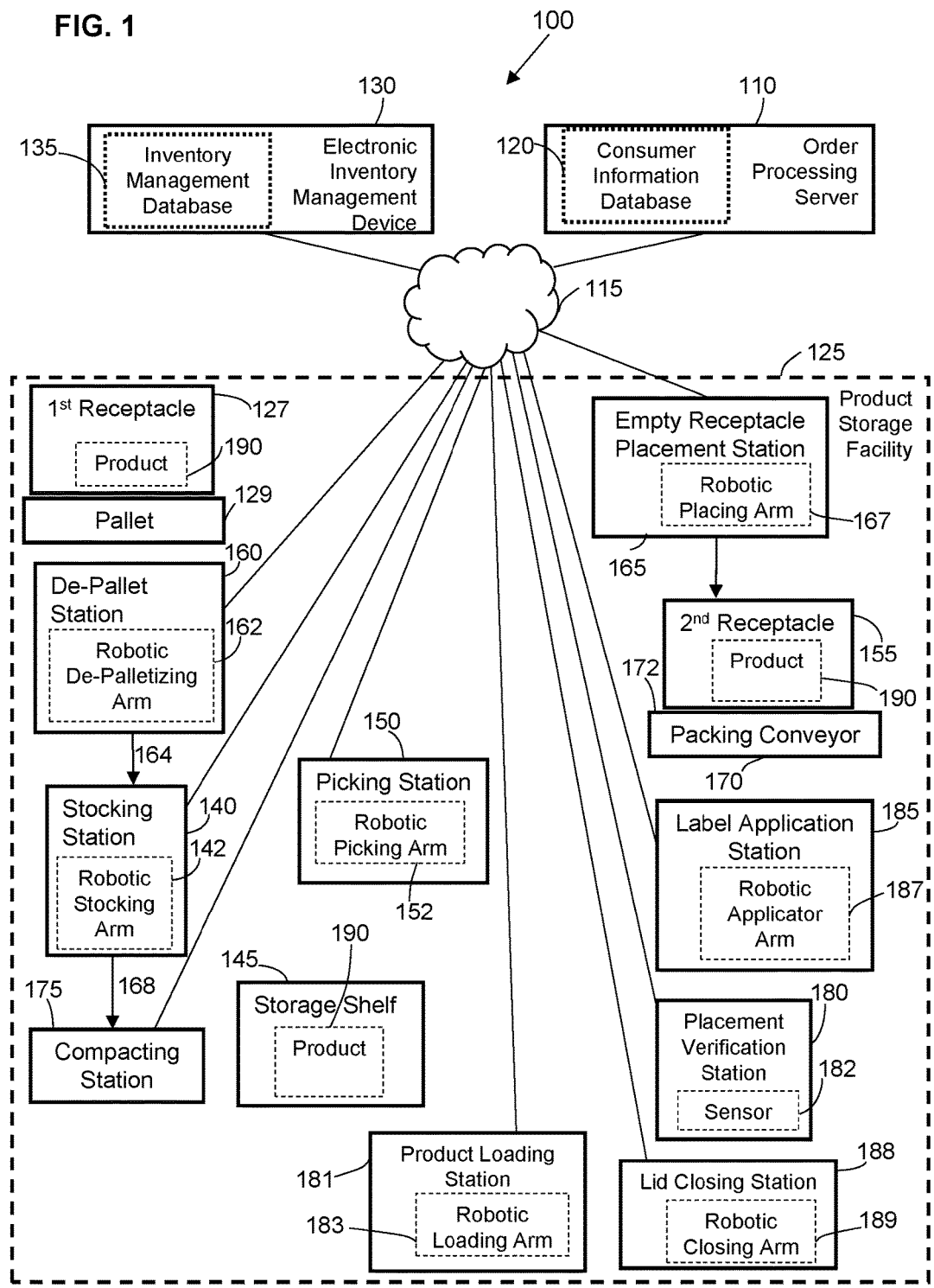
FIG. 1 is a diagram of an order fulfillment system in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for fulfilling consumer product orders via at least one robotic picking arm and at least one robotic stocking arm controlled by an electronic inventory management device.

In one embodiment, an order fulfillment system includes: an order processing server configured to process a product order placed by a consumer and to communicate information associated with the product order to an inventory management database configured to store the product order information; a de-pallet station including at least one robotic de-palletizing arm configured to unload a first receptacle from a pallet and to place the first receptacle unloaded from the pallet onto a de-palletizer conveyor configured to transport the first receptacle unloaded from the pallet to a stocking station; at least one stocking station including at least one robotic stocking arm configured to unload at least one product from the first receptacle and to place the at least one product unloaded from the first receptacle onto at least one storage shelf; a first picking station including a first robotic picking arm configured to pick a first product from the at least one storage shelf and to load the first product picked from the at least one storage shelf into a second receptacle for delivery to a consumer; an empty receptacle placement station including at least one robotic placing arm configured to place an empty second receptacle onto a packing conveyor including a product advancement surface configured to transport the empty second receptacle toward the first picking station for loading of the first product into the empty second receptacle; an electronic inventory management device including a processor-based control unit and configured to obtain the product order information from the inventory management database and to transmit a signal based on the product order information to at least one of the empty receptacle placement station and the first robotic picking arm. The control unit of the electronic inventory management device is configured to analyze the product order information obtained from the inventory management database and to generate a product loading order, a product loading location, and a product loading orientation for products to be loaded into the second receptacle. The system further includes at least one placement verification station including at least one scanner configured to scan the first product after placement of the first product into the second receptacle to confirm at least one of the following: that the first product was ordered by the consumer, that the first product was loaded into a correct location in the second receptacle, and that the first product was loaded into the second receptacle in a correct orientation.

In another embodiment, a method of fulfilling a product order by a consumer includes: providing an order processing server configured to process a product order placed by a consumer and to communicate information associated with the product order to an inventory management database configured to store the product order information; providing a de-pallet station including at least one robotic de-palletizing arm configured to unload a first receptacle from a pallet and to place the first receptacle unloaded from the pallet onto a de-palletizer conveyor configured to transport the first receptacle unloaded from the pallet to a stocking station; providing at least one stocking station including at least one robotic stocking arm configured to unload at least one product from the first receptacle and to place the at least one product unloaded from the first receptacle onto at least one storage shelf; providing a first picking station including a first robotic picking arm configured to pick a first product from the at least one storage shelf and to load the first product picked from the at least one storage shelf into a second receptacle for delivery to a consumer; providing an empty receptacle placement station including at least one robotic placing arm configured to place an empty second receptacle onto a packing conveyor including a product advancement surface configured to transport the empty second receptacle toward the first picking station for loading of the first product into the empty second receptacle; providing an electronic inventory management device including a processor-based control unit and configured to obtain the product order information from the inventory management database and to transmit a signal based on the product order information to at least one of the empty receptacle placement station and the first robotic picking arm; analyzing, via the control unit of the electronic inventory management device, the product order information obtained from the inventory management database and generating a product loading order, a product loading location, and a product loading orientation for products to be loaded into the second receptacle; and providing at least one placement verification station including at least one scanner configured to scan the first product after placement of the first product into the second receptacle to confirm at least one of the following: that the first product was ordered by the consumer, that the first product was loaded into a correct location in the second receptacle, and that the first product was loaded into the second receptacle in a correct orientation.

In yet another embodiment, an order fulfillment system includes: an order processing means for processing a product order placed by a consumer and for communicating information associated with the product order to an inventory management database configured to store the product order information; a de-pallet station including means for unloading a first receptacle from a pallet and placing the first receptacle unloaded from the pallet onto a de-palletizer conveyor configured to transport the first receptacle unloaded from the pallet to a stocking station; at least one stocking station including means for unloading at least one product from the first receptacle and for placing the at least one product unloaded from the first receptacle onto at least one storage shelf; a first picking station including a means for picking a first product from the at least one storage shelf and for loading the first product picked from the at least one storage shelf into a second receptacle for delivery to a consumer; an empty receptacle placement station including a means for placing an empty second receptacle onto a packing conveyor including a means for transporting the empty second receptacle toward the first picking station for loading of the first product into the empty second receptacle; an electronic inventory management device including a means for obtaining the product order information from the inventory management database and for transmitting a signal based on the product order information to at least one of the empty receptacle placement station and the first robotic picking arm. The means for obtaining the product order information is configured to analyze the product order information obtained from the inventory management database and to generate a product loading order, a product loading location, and a product loading orientation for products to be loaded into the second receptacle. The system further includes at least one placement verification station including a means for scanning the first product after placement of the first product into the second receptacle to confirm at least one of the following: that the first product was ordered by the consumer, that the first product was loaded into a correct location in the second receptacle, and that the first product was loaded into the second receptacle in a correct orientation FIG. 1 shows an embodiment of an order fulfillment system 100 for automatically fulfilling orders for products 190 purchased by consumers from a retailer. The retailer may be any entity operating as a brick-and-mortar physical location and/or a website accessible via the internet by way of which products 190 may be ordered by a consumer. A consumer may be an individual or a business entity. Exemplary products 190 that may be ordered by the consumers from the retailer via the system 100 may include, but are not limited to, general-purpose consumer goods, as well as consumable products, such as grocery products and/or other food items, medications, and dietary supplements.

The exemplary system 100 depicted in FIG. 1 includes an order processing server 110 of the retailer configured to receive and process a purchase order by the consumer for one or more products 190. The order processing server 110 may be implemented as one server at one location, or as multiple interconnected servers stored at multiple locations operated by or for the retailer. As described in more detail below, the order processing server 110 may communicate with one or more electronic devices of system 100 via a network 115. The network 115 may be a wide-area network (WAN), a local area network (LAN), a personal area network (PAN), a wireless local area network (WLAN), or any other internet or intranet network, or combinations of such networks. Generally, communication between variously electronic devices of system 100 may take place over hard-wired, cellular, Wi-Fi or Bluetooth networked components or the like. In some embodiments, one or more electronic devices of system 100 may include cloud-based features, such as cloud-based memory storage. Consumers may access the order processing server 110 of the retailer via a consumer electronic computing device, which may be a stationary, portable, and/or hand-held electronic device, for example, a desktop computer, a laptop computer, a tablet, a mobile phone, or any other electronic, processor-based device that may be configured for data entry and communication with the order processing server 110.

In the embodiment of FIG. 1, the order processing server 110 is coupled to a consumer information database 120. The consumer information database 120 may be configured to store information associated with a consumer who orders products 190 from the retailer. In some embodiments, the consumer information database 120 may store electronic information associated with the consumer, such as the consumer's personal information (e.g., name, address, payment method information), product order history, pending order status, product order options, and product storage, delivery, and/or pick-up options. The consumer information database 120 may be stored, for example, on non-volatile storage media (e.g., a hard drive, flash drive, or removable optical disk) internal or external to the order processing server 110, or internal or external to computing devices separate and distinct from the order processing server 110. It will be appreciated that the consumer information database 120 may likewise be cloud-based.

In some embodiments, the order processing server 110 is configured to receive and process an order by a consumer for a product 190, to receive and process payment for the product 190 from the consumer (in some aspects, via accessing the consumer information database 120), and to transmit electronic information based on the processed order (e.g., via the network 115) to an electronic inventory management device 130 at the product distribution facility 125 of the retailer associated with the geographic location of the consumer placing the order, or associated with a brick-and-mortar facility of the retailer associated with the geographic location of the consumer placing the order. It will be appreciated that while the order processing server 110 and the electronic inventory management device 130 are described herein as two separate devices located at separate locations (e.g., central data center, product distribution facility 125, or the like), in some embodiments, the system 100 may be confined to a single physical location.

The electronic inventory management device 130 located at the product distribution facility 125 of the retailer may be a stationary or portable electronic device, for example, a desktop computer, a laptop computer, a tablet, a mobile phone, or any other electronic device including a processor-based control circuit (i.e., control unit). In the embodiment of FIG. 1, the electronic inventory management device 130 is configured for data entry and processing as well as for communication with other devices of system 100 via the network 115 which, as described above, may be a wide-area network (WAN), a local area network (LAN), a personal area network (PAN), a wireless local area network (WLAN), or any other internet or intranet network, or combinations of such networks. It will be appreciated that the electronic inventory management device 130 may be located at a location remote to the product distribution facility 125. For example, the electronic inventory management device 130 may be located at the same location as the order processing server 110, or at a regional/central data center of the retailer, or at a brick-and-mortar facility of the retailer, and the like. In addition, it will be appreciated that the electronic inventory management device 130 and the order processing server 110 may be incorporated into one computing device or central server in some embodiments.

Figure 2:
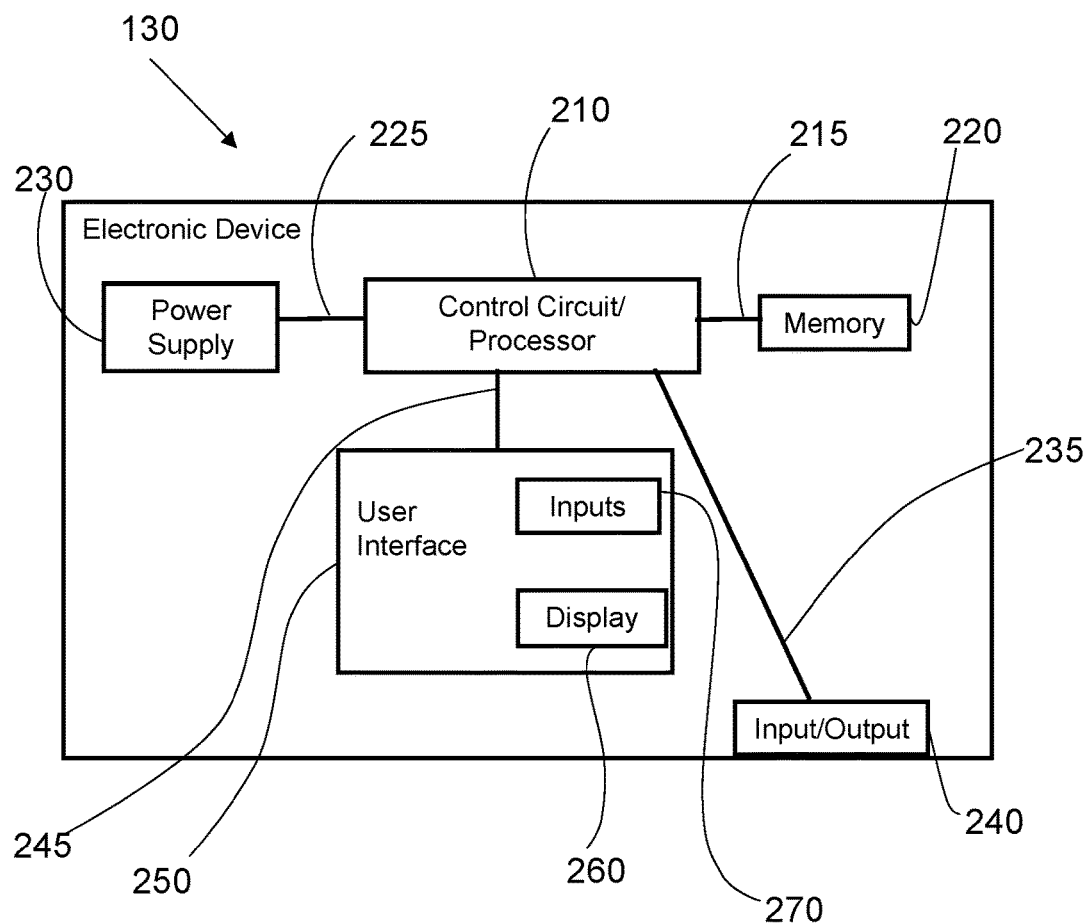
FIG. 2 is a functional diagram of an exemplary electronic inventory management device usable with the system of FIG. 1 in accordance with some embodiments.

With reference to FIG. 2, an exemplary electronic inventory management device 130 configured for use with exemplary systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

This control unit 210 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the electronic inventory management device 130 is also electrically coupled via a connection 235 to an input/output 240 that can receive signals from the order processing server 110 (e.g., data from the consumer information database 120 relating to a product order placed by the consumer) or from any other source that can communicate with the electronic inventory management device 130 via a wired or wireless connection. The input/output 240 can also send signals to the order processing server 110, or to any other device in wired or wireless communication with the electronic inventory management device 130 including, but not limited to: an inventory management database 135, a stocking station 140, a picking station 150, a de-pallet station 160, an empty receptacle placement station 165, a compacting station 175, a placement verification station 180, a label application station 185, and a lid closing station 188, which are shown in FIG. 1 and will be described in more detail below.

In the embodiment shown in FIG. 2, the processor-based control unit 210 of the electronic inventory management device 130 is electrically coupled via a connection 245 to a user interface 250, which may include a visual display or display screen 260 (e.g., LED screen) and/or button input 270 that provide the user interface 250 with the ability to permit an operator of the electronic inventory management device 130 to manually control the electronic inventory management device 130 by inputting commands via touchscreen and/or button operation and/or voice commands to, for example, set one or more delivery addresses and/or picking rules and/or packing rules with respect to a product 190 stored at a product distribution facility 125. It will be appreciated that the performance of such functions by the processor-based control unit 210 of the electronic inventory management device 130 is not dependent on a human operator, and that the control unit 210 may be programmed to perform such functions without a human operator.

In some embodiments, the display 260 of the electronic inventory management device 130 is configured to display various graphical interface-based menus, options, and/or alerts that may be transmitted from the electronic inventory management device 130 to, for example, the stocking station 140, picking station 150, de-pallet station 160, or the like, in connection with various aspects of fulfilling the order placed by the consumer at the product distribution facility 125 of the retailer. The inputs 270 of the electronic inventory management device 130 may be configured to permit an operator to navigate through the on-screen menus on the electronic inventory management device 130 and make changes and/or updates to the product orders and/or to the storage and/or packing options for the products 190 ordered by the consumer and stored at the product distribution facility 125. It will be appreciated that the display screen 260 may be configured as both a display screen and an input 270

(e.g., a touch-screen that permits an operator to press on the display screen 260 to enter text and/or execute commands.)

In some embodiments, the control unit 210 of the electronic inventory management device 130 may be programmed to generate product handling instruction signals for one or more of the stocking station 140, picking station 150, de-pallet station 160, empty receptacle placement station 165, compacting station 175, placement verification station 180, label application station 185, and lid closing station 188. Such product handling instruction signals may be generated by the control unit 210 electronic inventory management device 130 based on information received from the order processing server 110 and/or from the consumer information database 120 and/or from the inventory management database 135.

In the embodiment shown in FIG. 1, the product handling instruction signals may be transmitted from the electronic inventory management device 130 via the network 115. For example, the electronic inventory management device 130 may transmit a signal over the network 125 to the de-pallet station 155 indicating that a pallet 129 containing a product 190 ordered by a consumer has arrived at the product distribution facility 125 and instructing the de-pallet station 160 to pick the product 190 from its respective pallet 129. In one aspect, after the product 190 ordered by the consumer is unloaded at the de-pallet station 160 from the pallet 129, the product 190 may be transported (e.g., via a conveyor, mechanical arm, forklift, and/or other suitable means) to a stocking station 140, which may also receive signals containing instruction signals (described in more detail below) over the network 115 from the electronic inventory management device 130.

In the embodiment shown in FIG. 1, the electronic inventory management device 130 is coupled to an inventory management database 135. The electronic inventory management device 130 and the inventory management database 135 may be implemented as a single device at the product distribution facility 125 of the retailer as illustrated in FIG. 1. It will be appreciated, however, that the electronic inventory management device 130 and the inventory management database 135 may be separate devices, and may be located at different physical locations. The inventory management database 135 may be stored, for example, on non-volatile storage media (e.g., a hard drive, flash drive, or removable optical disk) internal or external to the electronic inventory management device 130, or internal or external to computing devices separate and distinct from the electronic inventory management device 130. In some embodiments, the inventory management database 135 may be cloud-based.

The exemplary inventory management database 135 of FIG. 1 is configured to store electronic data associated with the products 190 ordered by the consumers and being stored and/or transported for packing and delivery to the consumers (or to a brick-and-mortar facility of the retailer) at the product distribution facility 125. In some embodiments, the inventory management database 135 may store electronic data indicating one or more of: an inventory of available storage space (including location) and descriptions of the available storage space at the product distribution facility 125; an inventory of products 190 stored at and/or delivered to the product distribution facility 125; details of the consumer product orders such as the identification of the products 190 ordered by a consumer and the number of units of each product 190 ordered, and the name and address of consumers who ordered the products 190. In one aspect, the description of the available storage space at the product distribution facility 125 may be in the form of a grid-like map or planogram that indicates available storage space for products 190 on the storage shelves 145 of the product distribution facility 125. In some aspects, the inventory management database 135 is configured for real-time tracking of the inventory of available storage space and for real-time tracking of the inventory of products 190 at the product distribution facility 125.

In some embodiments, after one or more consumers place one or more orders for one or more products 190 via the order processing server 110, the order processing server 110 is configured to communicate the order information to the electronic inventory management device 130, the control unit 210 of which is programmed to analyze the ordered products 190 and to determine an optimal packing configuration for the products 190 for delivery to the consumers. The products 190 ordered by the consumer or consumers may then arrive to the product distribution facility 125 in one or more first receptacles 127 suited for retaining the products 190 (e.g., packages, boxes, totes, or the like) on one or more pallets 129. While the first receptacle 127 is shown as containing one product 190 in FIG. 1, it will be appreciated that the first receptacle 127 may contain dozens if not hundreds of products 190. The exemplary system 100 of FIG. 1 includes a de-pallet station 160 configured to unload the first receptacles 127 that arrive at the product distribution facility 125. In some embodiments, the de-pallet station 160 includes a robotic de-palletizing arm 162 configured to unload a first receptacle 127 from the pallet 129 and to place the first receptacle 127 unloaded from the pallet 129 onto a de-palletizer conveyor 164 configured to transport first receptacle 127 unloaded from a pallet 129 to a stocking station 140.

In the embodiment of FIG. 1, the system 100 further includes a stocking station 140 configured to unload one or more of the products 190 from the first receptacle 127 and to place such products 190 unloaded from the first receptacle 127 onto at least one storage shelf 145 at the product distribution facility 125. The embodiment of system 100 shown in FIG. 1 includes only one stocking station 140, but it will be appreciated that, depending on the size of the product distribution facility 125 and/or the volume of products 190 flowing through the product distribution facility 125, the system 100 may also include at least a second stocking station 140 and at least a third stocking station 140. In some embodiments, the stocking station 140 is configured to receive an instruction signal from the electronic inventory management device 130 via the network 115. As described in more detail below, such an instruction signal may include product unpacking and/or product stocking instructions generated at the electronic inventory management device 130 based on analysis of the consumer's order by the control unit 210 and based on the available storage space on storage shelves 145 at the product distribution facility 125.

In one aspect, the stocking station 140 includes one or more movable robotic arms 142. In some embodiments, the robotic picking arm 142 of the stocking station 140 is configured to remove the first receptacle 127 unloaded from the pallet 129 from the de-palletizer conveyor 164 and to open the first receptacle 127 removed from the de-palletizer conveyor 164. After opening the first receptacle 127 removed from the de-palletizer conveyor 164, the robotic picking arm 142 of the stocking station 140 is configured to unload one or more products 190 from the first receptacle 127 removed from the de-palletizer conveyor 164 such that the first receptacle 127 is empty. In one aspect, the robotic stocking arm 142 of the stocking station 140 is sized and shaped to accommodate various types of products 190 depending on the size, weight, and fragility of the products 190. When the first receptacle 127 is empty as a result of the products 190 in the first receptacle 127 having been unloaded by the robotic picking arm 142 of the stocking station 140, the robotic picking arm 142 is configured to place the emptied first receptacle 127 onto a disposal conveyor 168 configured to deliver the empty first receptacle 127 to a compacting station 175 configured to compact the empty first receptacle 127 for recycling purposes.

In the embodiment of FIG. 1, the system 100 further includes a picking station 150 configured to configured to pick one or more products 190 from one or more storage shelves 145 at the product distribution facility 125 and to load such one or more products 190 picked from the one or more shelves 145 into a second receptacle 155 for delivery to a consumer or to a brick-and-mortar facility of the retailer. While the second receptacle 155 is shown as containing one product 190 in FIG. 1, it will be appreciated that the second receptacle 155 may contain dozens if not hundreds of products 190. In one aspect, as shown in FIG. 1, the picking station 150 includes a robotic picking arm 152 configured for access one or more products 190 on one or more storage shelves 145 and configured for access to the second receptacle 155 located in a picking slot at the picking station 150. In one aspect, the robotic picking arm 152 of the picking station 150 is sized and shaped to accommodate various types of products 190 depending on the size, weight, and fragility of the products 190. While the embodiment of system 100 of FIG. 1 includes only one picking station 150, it will be appreciated that, depending on the size of the product distribution facility 125 and/or the volume of products 190 flowing through the product distribution facility 125, the system 100 may include more than just a first picking station 150.

For example, the system 100 may include a second picking station 150 downstream of the first picking station 150 and including a second robotic picking arm 152 configured to pick a second product 190 from a second storage shelf 145 and place the second product 190 picked from the second storage shelf 145 into the second receptacle 155 with the first product 190 for delivery to the consumer. Similarly, the system 100 may include a third picking station 150 downstream of the second picking station 150 and including a third robotic picking arm 152 configured to pick a third product 190 from a third storage shelf 145 and place the third product 190 picked from the third storage shelf 145 into the second receptacle 155 with the first and second products 190 for delivery. In one aspect, the system 100 includes one picking station having one robotic picking arm 152, and the second receptacles 155 circle around the robotic picking arm 152 on the product advancement surface 172 of the packing conveyor 170 until the robotic picking arm 152 places all of the products 190 required to be packed into all of the second receptacles 155.

In some embodiments, the picking station 150 is configured to receive a signal from the electronic inventory management device 130 via the network 115. As described in more detail below, such a signal may include product packing instructions generated at the electronic inventory management device 130 based on optimal packing analysis by the control unit 210 and sent from the electronic inventory management device 130 to the first picking station 150. The picking station 150 is in turn configured to receive such an instruction signal from the electronic inventory management device 130 and to cause one or more robotic picking arms 152 of the picking station 150 to pick a number the products 190 specified in the instruction signal from one or more storage shelves 145 and to place the picked products 190 into the second receptacle 155 in an order, location, and orientation specified in the instruction signal received by the picking station 150 from the electronic inventory management device 130.

In the embodiment of FIG. 1, the system 100 includes an empty receptacle placement station 165 configured to place an empty second receptacle 155 (e.g., a package, tote, box, etc.) onto a packing conveyor 170 including a product advancement surface 172 configured to transport the empty second receptacle 155 toward the first picking station 150 for loading of the first product 190 into the empty second receptacle 155. In one aspect, the empty receptacle placement station 165 includes a robotic placing arm 167 configured to place the empty second receptacle 155 onto the product advancement surface 172 of the packing conveyor 170 to enable the packing conveyor 170 to transport the empty second receptacle 155 toward the first picking station 150 for the loading of the first product 190 into the empty second receptacle 155.

In some embodiments, the empty receptacle placement station 165 is configured to receive instruction signals from the electronic inventory management device 130 via the network 115. For example, the electronic inventory management device 130 may transmit a signal over the network 115 to the empty receptacle placement station 165 instructing the empty receptacle placement station 165 to place an empty second receptacle 155 onto the packing conveyor 170 that transports the empty receptacle to the first picking station 150. Such a signal may include packing instructions sent from the electronic inventory management device 130 to the empty receptacle placement station 165 based on an analysis, by the control unit 210 of the electronic inventory management device 130, of the products 190 in the order placed by the consumer.

In the embodiment shown in FIG. 1, the system 100 further includes at least one label application station 185 configured for placing a label onto an empty second receptacle 155 placed onto the packing conveyor 170 by the empty receptacle placement station 165. In one aspect, the label application station 185 may include one or more robotic applicator arms 187 configured to apply a label including a name and address of the consumer onto the second receptacle 155. In one aspect, the label applied onto the second receptacle 155 at the label application station 185 may be a stick-on label having an adhesive side. In another aspect, the label applied onto the second receptacle 155 at the label application station 185 may be applied after an adhesive is applied to the exterior surface of the second receptacle 155. In some embodiments, the label application station 185 is located upstream of the picking station 150 and downstream of the empty receptacle placement station 165 along the packing conveyor 170.

In the embodiment of FIG. 1, the system 100 further includes at least one placement verification station 180 configured for verifying that one or more products 190 placed into the second receptacle 155 by the picking station 150 were properly placed into the second receptacle. In one aspect, the placement verification station 180 includes at least one sensor 182 configured to scan one or more products 190 placed into the second receptacle 155 to confirm at least one of the following: that the one or more products 190 in the second receptacle 155 were in fact ordered by the consumer, that the one or more products 190 were loaded into the second receptacle 155 in a correct location (e.g., according to product location instructions received at the picking station 150 from the electronic inventory management device 130), and that the one or more products 190 were loaded into the second receptacle 155 in a correct orientation (e.g., according to product orientation instructions received at the picking station 150 from the electronic inventory management device 130). A sensor 182 suitable for use at the placement verification station 180 may include but is not limited to one or more of a video camera, a motion sensor, an infrared sensor, a radio frequency identification (RFID) sensor, laser sensor, or the like. In some embodiments, the placement verification station 180 is located downstream of the picking station 150 along the packing conveyor 170.

In the embodiment of FIG. 1, the system 100 further includes at least one lid closing station 188 configured for closing the second receptacle 155 including one or more products 190 being packed for delivery from the product distribution facility 125. In one aspect, the lid closing station 188 may include one or more robotic closing arms 189 configured to close the second receptacle 155 by, for example, folding the cover flaps of the second receptacle 155 and/or sealing the cover flaps of the second receptacle 155 with, for example, adhesive tape. In some embodiments, the lid closing station 188 is located downstream of the picking station 150 along the packing conveyor 170.

In the embodiment of FIG. 1, the system 100 further includes at least one product loading station 181 configured for removing the closed second receptacle 155 from the packing conveyor 170 and to load the closed second receptacle 155 into a delivery vehicle for delivery. In one aspect, the product loading station 181 may include one or more robotic loading arms 183 configured to grasp the second receptacle 155, lift the second receptacle 155 off the packing conveyor 170, move the second receptacle 155 into the cargo area of the delivery vehicle, and place the second receptacle 155 into the cargo area of the delivery vehicle.

While the exemplary system 100 depicted in FIG. 1 includes a stocking station 140, a picking station 150, a de-pallet station 160, an empty receptacle placement station 165, a compacting station 175, a label application station 185, a placement verification station 180, and a lid closing station 188, it will be appreciated, however, that one or more of the separate stations of system 100 may be incorporated into a single station. For example, in some embodiments, the system 100 may include one or more stations including one or more robotic arms and/or sensors configured to: place an empty receptacle 155 onto the packing conveyor 170; pick the products 190 ordered by the consumer from one or more storage shelves 145 and place the products 190 into the second receptacle 155 on the packing conveyor 170; verify the correctness of the placement of the products 190 into the second receptacle 155; and/or close the lid of the second receptacle 155 after all of the products 190 have been loaded into the second receptacle 155.

FIG. 3 shows an embodiment of an exemplary method 300 of automatically processing an order for one or more products 190 purchased by a consumer from a retailer. To enable the consumer to purchase one or more products 190 from the retailer, the exemplary method 300 of FIG. 3 includes the step of providing an order processing server 110 configured to process a product order placed by a consumer and to transmit electronic data associated with the product order to an inventory management database 135 configured to store the product order information (step 310). As discussed above, electronic data associated with the product order that may be stored in the inventory management database 135 may include, but is not limited to the number of products 190 in the order, the size of the second receptacle 155 required to fit the products 190 ordered by the consumer, as well as the packing analysis data (e.g., loading order of second receptacles 155 onto the packing conveyor 170, loading order of products 190 into the second receptacles 155, loading location of the products 190 in the second receptacles 155, location, and loading orientation of the products 190 in the second receptacles 155.

In some embodiments, after the purchase order of the consumer for one or more products 190 is processed at the order processing server 110 and the products 190 ordered by the consumer are delivered to the product distribution facility 125 in at least a first receptacle 127 on a pallet 129 for sorting, storage, and eventual delivery to the consumer (or to a brick-and-mortar facility of the retailer associated with a geographic location of the consumer), the method 300 may include providing a de-pallet station 160 including at least one robotic de-palletizing arm configured to unload the first receptacle 127 from the pallet 129 and to place the first receptacle 127 unloaded from the pallet 129 onto a de-palletizer conveyor 164 configured to transport the first receptacle 127 unloaded from the pallet 129 to a stocking station 140 (step 320). In one aspect, such unloading and placing steps may be performed by one or more robotic de-palletizing arms 162 of the de-pallet station 160.

The exemplary method 300 further includes providing at least one stocking station 140 including at least one robotic stocking arm 142 configured to unload at least one product 190 from the first receptacle 127 traveling on the de-palletizer conveyor 164 and to place the at least one product 190 unloaded from the first receptacle 127 onto at least one storage shelf 145 at the product distribution facility 125 (step 330). More specifically, in some embodiments, the robotic stocking arm 142 of the stocking station 140 grasps the first receptacle 127 and removes the first receptacle 127 from the de-palletizer conveyor 164, opens the first receptacle removed from the de-palletizer conveyor 164, and unloads one or more products 190 from the first receptacle 127 such that the first receptacle 127 is empty. In some aspects, the robotic stocking arm 142 of the stocking station 140 opens the first receptacle 127 by cutting through the first receptacle 127 and/or tearing the lid of the first receptacle 127 and/or otherwise breaking up the first receptacle 127.

In some embodiments, the method 300 includes the robotic stocking arm 142 of the stocking station placing the empty first receptacle 127 (i.e., after all products 190 are unloaded) onto a disposal conveyor 168 configured to deliver the empty first receptacle 127 to a compacting station 175 configured to compact the empty first receptacle 127 (e.g., for recycling). In some embodiments, the compacting station 175 may not directly compact the empty first receptacle 127, but may act as a staging area from which empty first receptacles 127 may be moved via forklifts to a compactor and/or crushing device and processed. In one aspect, as the robotic stocking arm 142 places the empty first receptacle 127 onto the disposal conveyor 168, a new first receptacle 127 full of products 190 arrives at the stocking station 140 for the unloading of the products 190.

In some aspects, in order to place a product 190 unloaded from the first receptacle 127 onto a storage shelf 145, the robotic stocking arm 142 of the stocking station 140 is configured to pick up the product 190 and to transport the product 190 while gripping and/or otherwise retaining the product 190 to a storage shelf 145 where the identical units of the product 190 are stocked, and to drop and/or otherwise deposit the product 190 from the robotic stocking arm 142 onto the storage shelf 145 for storage. The robotic stocking arm 142 may be configured to place the product 190 at the rear of the storage shelf 145 behind other units of the product 190 already present on the storage shelf 145, or to place the product 190 at the front of the storage shelf 145 in front of other units of the product 190 already present on the storage shelf 145. In one aspect, the storage shelf 145 may be configured to stock products 190 in a gravity feed formation. In some embodiments, the stocking station 140 is configured to transmit a signal to the electronic inventory management device 130 including information identifying the storage shelf 145 where the products 190 delivered to the product distribution facility and stocked by the stocking station are stocked. In one aspect, the electronic inventory management device 130 is configured to transmit this information to the inventory management database 135, thus enabling the electronic inventory management device 130 to monitor, in real-time, the precise location of all products 190 at the product distribution facility 125, enabling quick and easy retrieval of these products 190 for packing and delivery to consumers or a brick-and-mortar facility of retailer.

In some embodiments, after the empty second receptacle 155 is placed on the packing conveyor 170 at the empty receptacle placement station 165, the method 300 further includes providing a label application station 185 upstream of the first picking station 150 and configured to apply a label including a name and address of the consumer (i.e., the intended addressee) onto the second receptacle 155. As discussed above, the label application station 185 may include a robotic applicator arm 187 that applies the label onto the second receptacle 155.

In order to fulfill one or more consumer orders for the products 190 stored on one or more storage shelves 145 at the product distribution facility 125, the method 300 of FIG. 3 further includes the step of providing a first picking station 150 including a first robotic picking arm 152 configured to pick a first product 190 from the at least one storage shelf 145 and to load the first product 190 picked from the at least one storage shelf 145 into a second receptacle 155 for delivery to a consumer (step 340). It will be appreciated that the first product 190 may be placed into the second receptacle 155 with other products 190 ordered by the consumer, and may be delivered in the second receptacle 155 to a brick-and-mortar facility of the retailer associated with the geographic location of the consumer instead of being delivered directly to the consumer.

In order to provide an empty second receptacle 155 to the picking station 150 for the loading of one or more products off one or more storage shelves 145, the exemplary method 300 shown in FIG. 3 further includes providing an empty receptacle placement station 165 including at least one robotic placing arm 167 configured to place the empty second receptacle 155 onto the packing conveyor 170 including a product advancement surface 172 configured to transport the empty second receptacle 155 toward the first picking station 150 for the loading of the first product 190 picked off one or more storage shelves 145 by one or more robotic picking arms 152 of the picking station 150 into the empty second receptacle 155 (step 350). As discussed above, the method 300 of FIG. 3 further includes the step of providing an electronic inventory management device 130 including a processor-based control unit 210 and configured to obtain the product order information from the inventory management database 135 and to transmit a signal based on the product order information to at least one of the empty receptacle placement station 165 and the first robotic picking arm 152 of the picking station 150 (Step 360).

As described above, the electronic inventory management device 130 is configured to transmit signals including product storing, picking, and packing instructions to one or more of the stocking station 140, picking station 150, and empty receptacle placement station 165. For example, in some embodiments, the method 300 further includes transmitting, from the electronic inventory management device 130 to the empty receptacle placement station 165, a signal indicating the size of the empty second receptacle 155 to be placed by the at least one robotic placing arm 167 of the empty receptacle placement station 165 onto the packing conveyor 170, and the empty receptacle placement station 165 in response to receiving such a signal causing the robotic placing arm 167 to select and place onto the packing conveyor 170 an empty second receptacle 155 having a size corresponding to the size indicated in the signal received from the electronic inventory management device 130. In some aspects, the method 300 includes analyzing, via the control unit 210 of the electronic inventory management device 130, the product order information obtained from the inventory management database 135 and generating a product loading order, a product loading location, and a product loading orientation for products 190 to be loaded into the second receptacle 155 (step 370).

In one aspect, the picking station 150 is configured to pick one or more products 190 from one or more storage shelf 145 in order to fulfill an order placed by the consumer based on a signal including packing instructions sent over the network 115 from the electronic inventory management device 130 to the picking station 150. In some embodiments, the method 300 of FIG. 3 further includes transmitting a signal from the electronic inventory management device 130 to the picking station 150 indicating a number of units of the product 190 to be picked by the first robotic picking arm 152 from one or more storage shelves 145 and loaded into the empty second receptacle 155. In one aspect, the method 300 includes, in response to receiving such a signal from the electronic inventory management device 130, the picking station 150 causing one or more robotic picking arms 152 to pick a number of units of one or more products 190 from one or more storage shelves 145 based on the number of units of the first product 190 indicated in the signal.

In some embodiments, the method 300 of FIG. 3 further includes transmitting a signal including packing instructions from the electronic inventory management device 130 to the picking station 150, with the signal indicating at least the loading order, loading location, and loading orientation of the consumer-ordered products 190 by one or more robotic picking arms 152 from one or more storage shelves 145 and into the second receptacle 155. In one aspect, the method 300 includes, in response to receiving such a signal from the electronic inventory management device 130, the picking station 150 causing one or more robotic picking arms 152 to pick products 190 off one or more shelves 145 in the order specified in the signal and to place the products 190 into the second receptacle 155 in the location and orientation specified in the signal. In some embodiments, as an empty second receptacle 155 arrives at a pick slot of the picking station 150, the robotic picking arm 152 of the picking station scans a label placed on the empty second receptacle 155 at the label application station 185 to determine the intended addressee of the empty second receptacle 155, and to thereby determine (e.g., by obtaining appropriate product order information from the inventory management database 135 by way of the electronic inventory management device 130) which products 190 and how many products 190 are to be packed into the empty second receptacle 155.

In some embodiments, the packing instructions transmitted from the electronic inventory management device 130 to the picking station 150 are based on the optimal packing analysis performed in step 370 by the control unit 210 of the electronic inventory management device 130. For example, the packing instructions transmitted from the electronic inventory management device 130 may instruct the robotic picking arms 152 of the picking station 150 to perform actions including, but not limited to: packing heavier products 190 first and/or on the bottom of the second receptacle 155 (e.g., tote, box, package, or the like); packing products 190 into the second receptacle 155 such that they will not roll or otherwise move from their intended place during movement of the second receptacle 155 along the product advancement surface 172 of the packing conveyor 170; packing the products 190 into the second receptacle 155 such that the weight of the products 190 is distributed equally; packing the products 190 into the second receptacle 155 such that the total weight of the second receptacle is manageable (e.g., liftable by the robotic arms and/or by the delivery driver assigned to deliver the second receptacle 155); packing the products 190 into the second receptacle 155 such that fragile products 190 are placed into the second receptacle 155 only with products 190 that will not damage the fragile products 190 during transportation on the packing conveyor 170 or during delivery; packing the products 190 into the second receptacle 155 only after adding protective packing material to the second receptacle 155 to minimize damage to the products 190 in the second receptacle 155; packing the products 190 into the second receptacle 155 such that the products 190 are tightly packed in the second receptacle 155 and packing space is not wasted; packing the products 190 into the second receptacle 155 only after adding a disposable package into the second receptacle 155, such that the disposable package containing the products 190 may be removed from the second receptacle 155 and handed to the consumer on delivery and the second receptacle 155 may be returned to the product distribution facility 125 by the delivery driver; packing the products 190 into the second receptacle 155 by moving and loading the products 190 appropriately to the size, weight, and/or fragility of the products 190. For example, for a second receptacle 155 that contains grocery products 190, packing instructions transmitted from the electronic inventory management device 130 may instruct the robotic picking arms 152 of the picking station 150 to place cans of corn and other canned products 190 on the bottom of the second receptacle and eggs and tomatoes on top.

In some embodiments, after one or more products 190 ordered by the consumer are packed into the second receptacle 155 at the first picking station 150, the method 300 further includes the step of providing a first placement verification station 180 including at least one sensor 182 configured to scan the first product 190 after the placement of the first product 190 into the second receptacle 155 to confirm one or more of the following: that the one or more products 190 in the second receptacle 155 were in fact ordered by the consumer, that the one or more products 190 were loaded into the second receptacle 155 in a correct location, and that the one or more products 190 were loaded into the second receptacle 155 in a correct orientation (step 380). To that end, in some embodiments, the sensor 182 may be configured as a scanner for scanning the second receptacle 155 and the first product 190 and to obtain electronic identifying data associated with the second receptacle 155 and the first product 190 by communicating via a communication channel (e.g., radio waves) with a unique identifying indicia (e.g., barcode, RFID, SKU, or the like) on an exterior of the first product 190 and on an exterior of the second receptacle 155.

In some embodiments, the sensor 182 of the placement verification station 180 may be a video camera configured to provide video analytics detecting the location and orientation of one or more products 190 packed in the second receptacle 155. It will be appreciated that while FIG. 1 shows one picking station 150 and one placement verification station 180, multiple products 190 may be placed into the second receptacle 155 at multiple (e.g., first, second, third, fourth, etc.) picking stations 150, and multiple placement verification stations 180 (e.g., first, second, third, fourth, etc.) may be positioned along the travel path of the second receptacle 155 on the product advancement surface 172 of the packing conveyor 170 to confirm that the products 190 are being loaded into the second receptacle 155 properly (i.e., according to the above-described packing instructions transmitted from the electronic inventory management device 130).

In some aspects, the sensor 182 of the placement verification station 180 is configured to send an alert via the network 115 to the electronic inventory management device 130 indicating that, for example, one or more tolerances (e.g., weight) in the second receptacles 127 is exceeded, of that one or more products 190 have been improperly packed into one or more of the second receptacles 127. In one aspect, upon receiving an alert signal from the sensor 182 of the placement verification station 180 that one or more products 190 have been incorrectly packed into one or more second receptacles 127, the control unit 210 of the electronic inventory management device 130 is programmed to generate and transmit a signal shutting down one or more of the components of the system 100 (e.g., picking station 150, packing conveyor 170, etc.) in order to transmit supplemental instructions via the network 115 to the picking station 150 in order to remedy the condition giving rise to the alert (e.g., by utilizing one or more of the robotic picking arms 152 to remove one or more of the improperly packed products 190 from one or more of the second receptacles 155 and properly repacking the second receptacles with the products 190.

In some embodiments, as the second receptacle 155 containing one or more products 190 ordered by a consumer travels down the packing conveyor 170 after the correct placement of the products 190 in the second receptacle has been confirmed at one or more placement verification stations 180, the method 300 further includes providing a lid closing station 188 downstream of the first (and/or second and/or third, etc.) picking station 150 and downstream of the placement verification station 180. In some aspects, the lid closing station 188 and configured to close the second receptacle 155 after all of the products required to be in the second receptacle 155 have been packed according to the packing instructions generated at the electronic inventory management device 130. As discussed above, the lid closing station 188 may include one or more movable robotic closing arms 189 configured to close the second receptacle 155.

In some embodiments, after the second receptacle 155 is closed at the lid closing station 188, the method 300 of FIG. 3 may further include providing a product loading station 181 downstream of the lid closing station 188 and configured to remove the closed second receptacle 155 from the packing conveyor 170 and to load the second receptacle into the cargo area of a delivery vehicle that will be used to deliver the second receptacle 155 to the consumer or to the brick-and-mortar facility of the retailer associated with the geographic location of the consumer. As discussed above, the product loading station 181 may include one or more movable robotic arms 183 that grasp the second receptacle 155, lift the second receptacle 155 off the packing conveyor 170, move the second receptacle 155 into the cargo area of the delivery vehicle, and place the second receptacle into the cargo area of the delivery vehicle.

As discussed above, the control unit 210 of the electronic inventory management device 130 is programmed to determine an optimal packing order of the products 190 into the second receptacles 155 traveling on the product advancement surface 172 of the packing conveyor 170. In some aspects, the control unit 210 of the electronic inventory management device 130 is programmed to determine an optimal loading order of the second receptacles 155 into the cargo area of the delivery vehicle that will be used to deliver the second receptacles from the product distribution facility 125. As such, the packing instructions transmitted from the electronic inventory management device to the empty receptacle placement station 165 and/or to the picking station 150 may include instructions indicating an order in which the second receptacles 155 are to be placed onto the packing conveyor 170. In one aspects, a second receptacle 155 that is to be unloaded from the delivery truck last will be placed (after being packed with products 190) onto and removed from the packing conveyor 170 first and placed first (and deepest) into the cargo area of the delivery vehicle. Conversely, a second receptacle 155 that is to be unloaded from the delivery truck first will be placed (after being packed with products 190) onto and removed from the packing conveyor 170 last and placed first (enabling easy access) into the cargo area of the delivery vehicle.

The systems and methods described herein advantageously allow products to be automatically sorted, stocked, picked, and packed for delivery to consumers at a single location without requiring manual handling of either the products or delivery containers by workers at the product distribution facility. The systems and methods describe herein thus provide significant operation efficiency and operation cost reduction for retailers.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An order fulfillment system, the system comprising:
    an order processing server configured to process a product order placed by a consumer and to communicate product order information associated with the product order to an inventory management database configured to store the product order information;
    a de-pallet station including at least one robotic de-palletizing arm configured to unload a first receptacle from a pallet and to place the first receptacle unloaded from the pallet onto a de-palletizer conveyor configured to transport the first receptacle unloaded from the pallet to a stocking station;
    at least one stocking station including at least one robotic stocking arm configured to unload at least one product from the first receptacle and to place the at least one product unloaded from the first receptacle onto at least one storage shelf;
    a first picking station including a first robotic picking arm configured to pick a plurality of products including a first product from the at least one storage shelf and to load the plurality of products including the first product picked from the at least one storage shelf into a second receptacle for delivery to a consumer;
    an empty receptacle placement station including at least one robotic placing arm configured to place an empty second receptacle onto a packing conveyor including a product advancement surface configured to transport the empty second receptacle toward the first picking station for loading of the plurality of products including the first product into the empty second receptacle;
    an electronic inventory management device including a processor-based control unit and configured to obtain the product order information from the inventory management database and to transmit a signal based on the product order information to at least one of the empty receptacle placement station and the first robotic picking arm, the control unit of the electronic inventory management device being configured to analyze the product order information obtained from the inventory management database and to generate a product loading order, a product loading location, and a product loading orientation for products to be loaded into the second receptacle, wherein:
        the first picking station is configured, in response to receipt of the signal from the electronic inventory management device, to cause the first robotic picking arm to place the plurality of products including the first product into the empty second receptacle in the product loading location and in the product loading orientation specified in the signal received by the first picking station from the electronic inventory management device; and
    at least one placement verification station including at least one scanner configured to scan the plurality of products including the first product after placement of the plurality of products including the first product into the second receptacle to confirm at least one of the following: that the plurality of products including the first product was ordered by the consumer, and that the plurality of products including the first product was loaded by the first robotic picking arm of the first picking station into the second receptacle in the product loading location and in the product loading orientation specified in the signal received by the first picking station from the electronic inventory management device.

2. The system of claim 1, wherein the at least one robotic stocking arm is configured to:
    remove the first receptacle unloaded from the pallet from the de-palletizer conveyor;
    open the first receptacle removed from the de-palletizer conveyor;
    unload the at least one product from the first receptacle removed from the de-palletizer conveyor such that the first receptacle is empty; and
    place the empty first receptacle onto a disposal conveyor configured to deliver the empty first receptacle to a compacting station configured to compact the empty first receptacle.

3. The system of claim 1,
    wherein the signal that the electronic inventory management device is configured to transmit to the empty receptacle placement station indicates the size of the empty second receptacle to be placed by the at least one robotic placing arm on the packing conveyor; and wherein, the empty receptacle placement station is configured to receive the signal from the electronic inventory management device and to cause the at least one robotic placing arm to select and place onto the packing conveyor an empty second receptacle having a size corresponding to the size indicated in the signal.

4. The system of claim 1,
wherein the signal that the electronic inventory management device is configured to transmit to the first picking station indicates a number of units of the first product to be picked by the first robotic picking arm from the at least one storage shelf and loaded into the second receptacle, and
wherein, the first picking station is configured to receive the signal from the electronic inventory management device and to cause the first robotic picking arm to pick a number of units of the first product from the at least one storage shelf corresponding to the number of units of the first product indicated in the signal.

5. The system of claim 1, further comprising:
a second picking station downstream of the first picking station, the second picking station including a second robotic picking arm configured to pick a second product from a second storage shelf and to place the second product picked from the second storage shelf into the second receptacle together with the first product for delivery to the consumer; and
a third picking station downstream of the second picking station, the third picking station including a third robotic picking arm configured to pick a third product from a third storage shelf and to place the third product picked from the third storage shelf into the second receptacle together with the first and second products for delivery to the consumer.

6. The system of claim 1, further comprising a lid closing station downstream of the first picking station and configured to close the second receptacle including the plurality of products including the first product.

7. The system of claim 1, further including a label application station upstream of the first picking station and configured to apply a label including an address of the consumer onto the second receptacle.

8. A method of fulfilling a product order by a consumer, the method comprising:
providing an order processing server configured to process a product order placed by a consumer and to communicate product order information associated with the product order to an inventory management database configured to store the product order information;
providing a de-pallet station including at least one robotic de-palletizing arm configured to unload a first receptacle from a pallet and to place the first receptacle unloaded from the pallet onto a de-palletizer conveyor configured to transport the first receptacle unloaded from the pallet to a stocking station;
providing at least one stocking station including at least one robotic stocking arm configured to unload at least one product from the first receptacle and to place the at least one product unloaded from the first receptacle onto at least one storage shelf;
providing a first picking station including a first robotic picking arm configured to pick a plurality of products including the first product from the at least one storage shelf and to load the plurality of products including the first product picked from the at least one storage shelf into a second receptacle for delivery to a consumer;
providing an empty receptacle placement station including at least one robotic placing arm configured to place an empty second receptacle onto a packing conveyor including a product advancement surface configured to transport the empty second receptacle toward the first picking station for loading of the plurality of products including the first product into the empty second receptacle;
providing an electronic inventory management device including a processor-based control unit and configured to obtain the product order information from the inventory management database and to transmit a signal based on the product order information to at least one of the empty receptacle placement station and the first robotic picking arm;
in response to receipt of the signal from the electronic inventory management device, causing, via the first picking station, the first robotic picking arm to place the plurality of products including the first product into the empty second receptacle in the product loading location and in the product loading orientation specified in the signal received by the first picking station from the electronic inventory management device;
analyzing, via the control unit of the electronic inventory management device, the product order information obtained from the inventory management database and generating a product loading order, a product loading location, and a product loading orientation for products to be loaded into the second receptacle; and
providing at least one placement verification station including at least one scanner configured to scan the plurality of products including the first product after placement of the plurality of products including the first product into the second receptacle to confirm at least one of the following: that the plurality of products including the first product was ordered by the consumer, and that the plurality of products including the first product was loaded into the second receptacle by the first robotic picking arm of the first picking station in the product loading location and in the product loading orientation specified in the signal received by the first picking station from the electronic inventory management device.

9. The method of claim 8, further comprising:
removing, via the at least one robotic stocking arm, the first receptacle unloaded from the pallet from the de-palletizer conveyor;
opening, via the at least one robotic stocking arm, the first receptacle removed from the de-palletizer conveyor;
unloading, via the at least one robotic stocking arm, the at least one product from the first receptacle removed from the de-palletizer conveyor such that the first receptacle is empty; and
placing, via the at least one robotic stocking arm, the empty first receptacle onto a disposal conveyor configured to deliver the empty first receptacle to a compacting station configured to compact the empty first receptacle.

10. The method of claim 8, further comprising:
transmitting the signal from the electronic inventory management device to the empty receptacle placement station, the transmitted signal indicating the size of the empty second receptacle to be placed by the at least one robotic placing arm on the packing conveyor; and
receiving the signal at the empty receptacle placement station and causing the at least one robotic placing arm to select and place onto the packing conveyor an empty second receptacle having a size corresponding to the size indicated in the signal.

11. The method of claim 8, further comprising:
transmitting the signal from the electronic inventory management device to the first picking station, the signal indicating a number of units of the first product to be picked by the first robotic picking arm from the at least one storage shelf and loaded into the second receptacle, and receiving, at the first picking station, the signal from the electronic inventory management device, and causing the first robotic picking arm to pick a number of units of the first product from the at least one storage shelf corresponding to the number of units of the first product indicated in the signal.

12. The method of claim 8, further comprising:
providing a second picking station downstream of the first picking station, the second picking station including a second robotic picking arm configured to pick a second product from a second storage shelf and to place the second product picked from the second storage shelf into the second receptacle together with the first product for delivery to the consumer; and providing a third picking station downstream of the second picking station, the third picking station including a third robotic picking arm configured to pick a third product from a third storage shelf and to place the third product picked from the third storage shelf into the second receptacle together with the first and second products for delivery to the consumer.

13. The method of claim 8, further comprising providing a lid closing station downstream of the first picking station and configured to close the second receptacle including the plurality of products including the first product.

14. The method of claim 8, further comprising providing a label application station upstream of the first picking station and configured to apply a label including an address of the consumer onto the second receptacle.

15. An order fulfillment system, the system comprising:
an order processing means for processing a product order placed by a consumer and for communicating product order information associated with the product order to an inventory management database configured to store the product order information;

a de-pallet station including means for unloading a first receptacle from a pallet and placing the first receptacle unloaded from the pallet onto a de-palletizer conveyor configured to transport the first receptacle unloaded from the pallet to a stocking station;

at least one stocking station including means for unloading at least one product from the first receptacle and for placing the at least one product unloaded from the first receptacle onto at least one storage shelf;

a first picking station including a means for picking a plurality of products including the first product from the at least one storage shelf and for loading the plurality of products including the first product picked from the at least one storage shelf into a second receptacle for delivery to a consumer;

an empty receptacle placement station including a means for placing an empty second receptacle onto a packing conveyor including a means for transporting the empty second receptacle toward the first picking station for loading of the plurality of products including the first product into the empty second receptacle;

an electronic inventory management device including a means for obtaining the product order information from the inventory management database and for transmitting a signal based on the product order information to at least one of the empty receptacle placement station and the first robotic picking arm, the means for obtaining the product order information being configured to analyze the product order information obtained from the inventory management database and to generate a product loading order, a product loading location, and a product loading orientation for products to be loaded into the second receptacle, wherein:

the first picking station is configured, in response to receipt of the signal from the electronic inventory management device, to cause the means for picking the plurality of products including the first product to place the plurality of products including the first product into the empty second receptacle in the product loading location and in the product loading orientation specified in the signal received by the first picking station from the electronic inventory management device; and at least one placement verification station including a means for scanning the plurality of products including the first product after placement of the plurality of products including the first product into the second receptacle to confirm at least one of the following: that the plurality of products including the first product was ordered by the consumer, that the plurality of products including the first product was loaded into the second receptacle by the means for picking of the first picking station in the product loading location and in the product loading orientation specified in the signal received by the first picking station from the electronic inventory management device.

\* \* \* \* \*